(No Model.) 2 Sheets—Sheet 1.
A. TAYLOR.
HYDRAULIC STUMP EXTRACTOR.
No. 470,086. Patented Mar. 1, 1892.
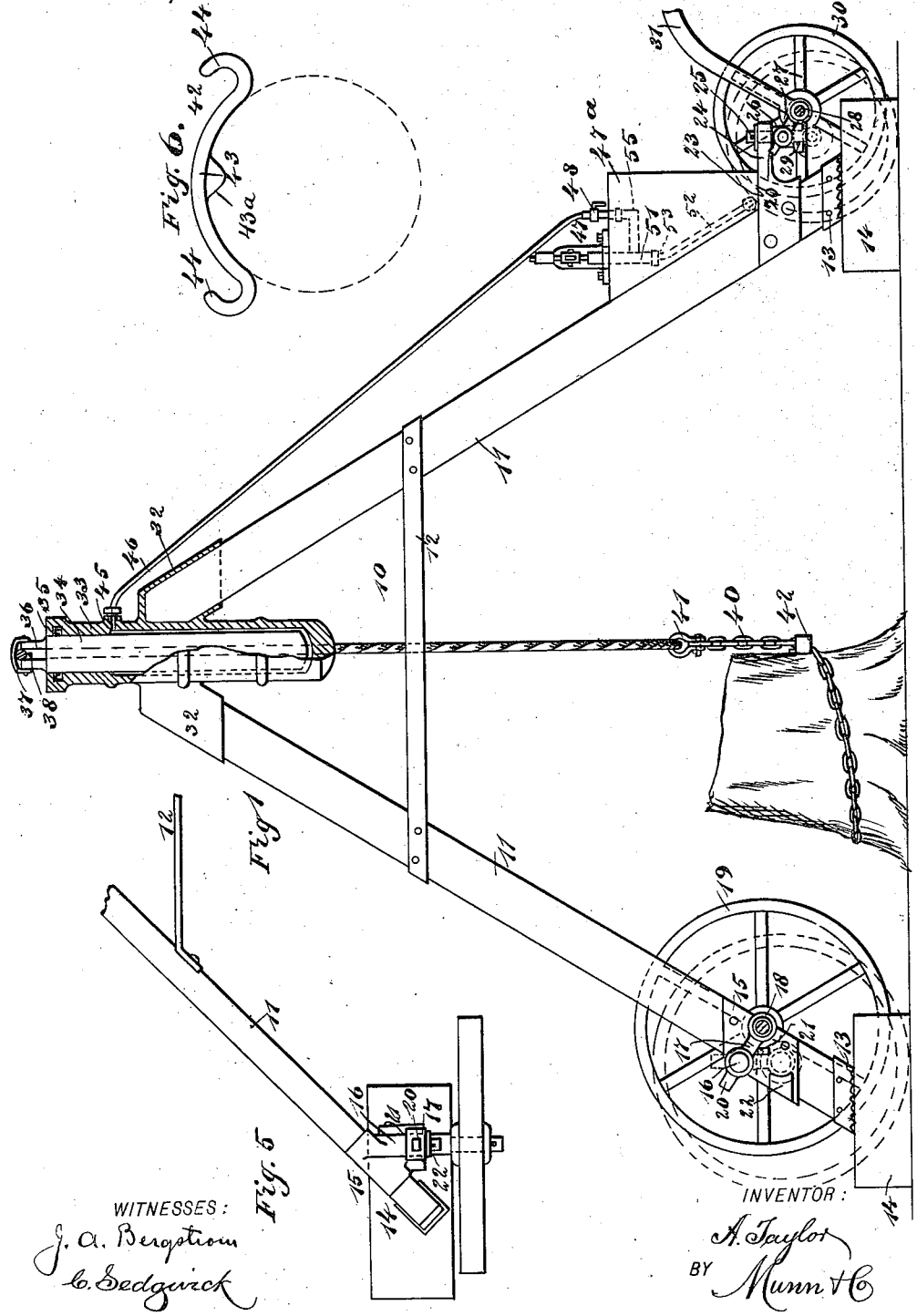
WITNESSES:
J. A. Bergstrom
C. Sedgwick
INVENTOR:
A. Taylor
BY Munn & Co
ATTORNEYS

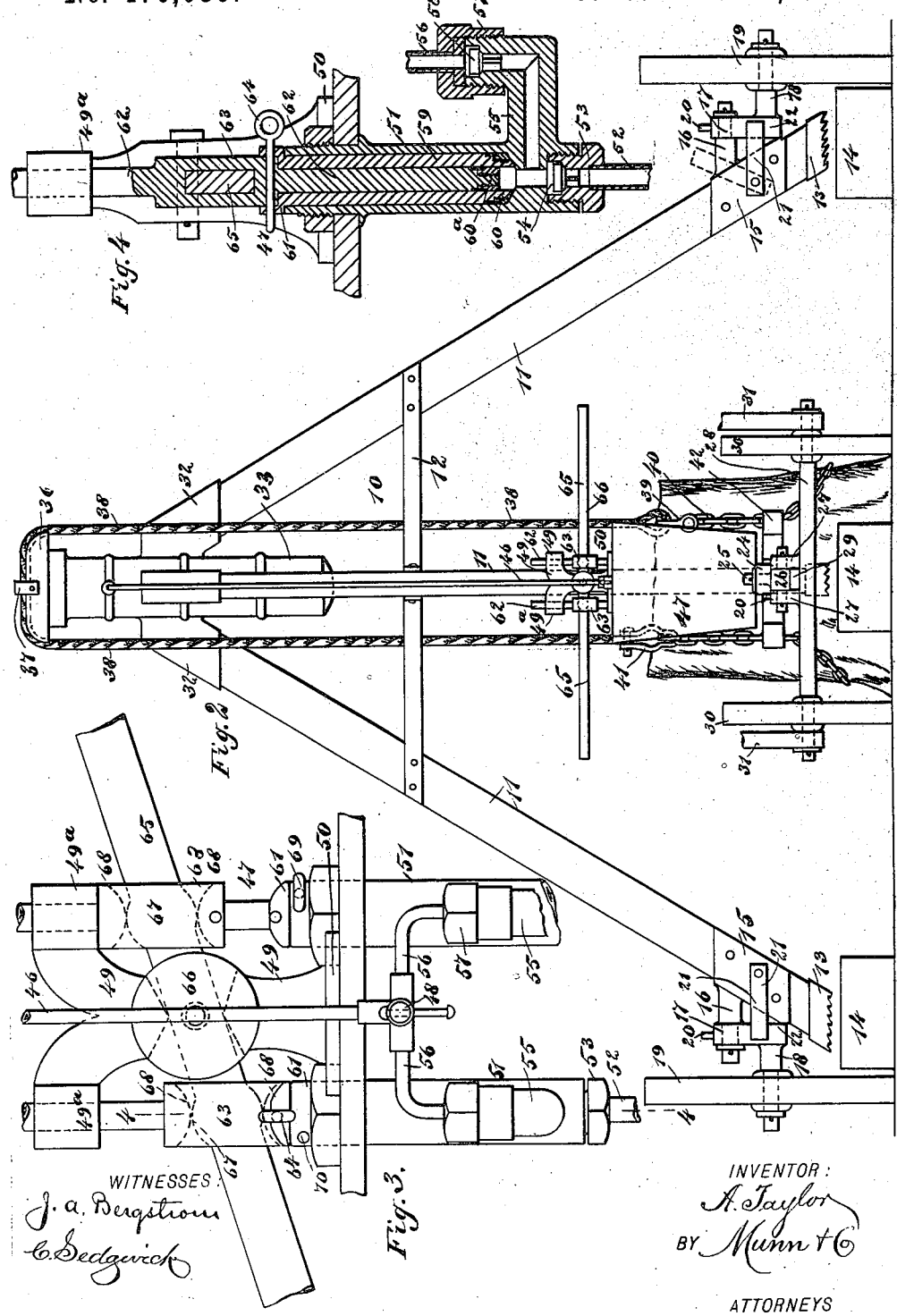

UNITED STATES PATENT OFFICE.

ALFRED TAYLOR, OF SAN FRANCISCO, CALIFORNIA, ASSIGNOR OF ONE-HALF TO E. J. MAHONEY, T. W. SHAW, AND R. A. DONALD, OF SAME PLACE.

HYDRAULIC STUMP-EXTRACTOR.

SPECIFICATION forming part of Letters Patent No. 470,086, dated March 1, 1892.

Application filed November 11, 1891. Serial No. 411,589. (No model.)

*To all whom it may concern:*

Be it known that I, ALFRED TAYLOR, of San Francisco, in the county of San Francisco and State of California, have invented a new and Improved Hydraulic Stump-Extractor, of which the following is a full, clear, and exact description.

My invention relates to improvements in stump-extractors; and the object of my invention is to produce a simple and powerful extractor which may be quickly applied to a stump or other object to be lifted and which may be easily and rapidly operated.

To this end my invention consists in certain features of construction and combinations of parts, as will be hereinafter described and claimed.

Reference is to be had to the accompanying drawings, forming a part of this specification, in which similar figures of reference indicate corresponding parts in all the views.

Figure 1 is a sectional side elevation of the extractor, the lifting-cylinder being broken away to show its internal construction. Fig. 2 is a front view of the machine, showing the wheels upon the ground. Fig. 3 is an enlarged detail front elevation of the pump which is used to force water into the lifting-cylinder. Fig. 4 is a vertical section through one cylinder of the pump on the line 4 4 of Fig. 3. Fig. 5 is a broken plan view showing the connection between the main frame and one of the rear wheels, and Fig. 6 is a detail plan view of the grip which is applied to the stump or other object to be raised.

The frame 10 of the machine consists of a tripod having legs 11, which are united by cross-braces 12. The lower ends of the legs terminate in metallic shoes 13, which are roughened on the under side, so that they will not slip on the supporting-blocks 14, which blocks are placed underneath the legs of the tripod when the machine is to be used.

The tripod is arranged so that the rear wheels may be applied to two legs thereof, and the third leg will extend forward, so as to be conveniently attached to the forward wheels of the machine. Each rear leg of the tripod is provided near its lower end with a bracket 15, which has an outwardly-extending horizontal arm 16, on which is pivoted a crank 17 of the axle 18, which axle rests in a wheel 19 in the usual way. At the top of the crank is a spur 20, to which a large socketed wrench may be applied so as to turn the crank and raise or lower the tripod, and on one side of the bracket 15 is a latch 21, which is adapted to be turned into the path of the crank 17, so as to hold it in a desired position in relation to the tripod or frame, and consequently the frame may be quickly adjusted in either a raised or lowered position. The bracket 15 is also provided with a cushion or block 22, against which the crank may rest when the wheels are upon the ground, as shown by dotted lines in Fig. 1.

The front leg of the tripod is provided near its lower end with a bracket 23, having a forwardly-extending portion 24, through which the king-pin 25 passes to secure the bracket to the forward axle. This king-pin passes through a block 26, which is carried between the free ends of the cranks 27, which cranks are produced centrally on the square forward axle 28, and to hold the front leg of the tripod in an elevated position the wedge 29 is used, which wedge is inserted between the head of the king-bolt and the axle. The forward axle 28 rests in wheels 30 in the usual way, and secured to the axle are shafts 31, which enable the machine to be drawn, and it is obvious that a pole or other drawing attachment may be substituted for the shafts.

The upper ends of the tripod-legs 11 fit in sockets 32, which are formed integral with the lifting-cylinder 33, which cylinder is made water-tight, is open at its upper end, and carries a piston or ram 34, the lower portion of the cylinder being slightly larger than the ram, so as to admit water between the ram and cylinder. The upper end of the cylinder is packed, as shown at 35 in Fig. 1, so as to prevent the escape of water.

The piston or ram 34 extends upward through the cylinder and terminates at its upper end in a grooved head 36, which is provided with a keeper 37, extending over the top of it, and the head carries a cable 38, which extends downward through the tripod and connects at one end by means of an ordinary shackle 39 with a chain 40, which is adapted to be wrapped around a stump or other object, and at its other end it connects with the chain by means of the usual devil-shackle 41, which enables the chain to be adjusted so as to fit objects of different sizes.

The chain 40 when applied to a stump is passed through the ends of a grip 42, which grip is bent in the center, as shown at 43, to enable it to approximately fit a stump, has a central spur 43ª to prevent it from slipping, and has its ends doubled over, as shown at 44, so as to form keepers in which the chain 40 may slide. When the chain is applied to a stump, it is passed over it in a loop, as shown in Figs. 1 and 2, the grip 42 is placed upon the chain so that its bent or curved central portion 43 will fit the stump, and when a lifting strain is applied to the chain the grip 42, by bearing against the stump, will form a fulcrum and prevent the chain from slipping.

The lifting-cylinder 33 is provided with a vent 45 on one side, which permits water to flow in and out of the cylinder, and a water-pipe 46 connects with the cylinder at this point and extends downward to the base of the frame and to the front portion of the same, where it connects with a force-pump 47, which is adapted to supply the lifting-cylinder with water, and at the base of the pipe 46 is a valve 48, by means of which the water may be withdrawn from the pipe and from the cylinder 33. This valve should be arranged so as to allow the water to flow back into the tank 47ª when the valve is opened, and the water will thus be used over and over. This tank 47ª is supported at the base of the front tripod-leg and contains sufficient water to supply the cylinder 33.

The pump 47 is mounted upon the tank and is supported upon a double bracket 49, which bracket has oppositely-extending arms 49ª at its upper end and has a suitable base 50 at its lower end. The pump is a double pump and also a compound pump, as described below. The pump is provided with two similar parallel cylinders 51, which extend downward into the tank 47ª and which are provided with pipes 52, which extend downward to the bottom of the tank, so that the water may be all withdrawn therefrom. The pipes 52 connect with the cylinders 51 by means of the usual couplings 53, in which is an ordinary check-valve 54. Opening from each cylinder 51 is an outlet-pipe 55, and the two outlet-pipes connect by means of a U-pipe 56 with the pipe 46, which supplies the cylinder 33. The connection between the pipes 55 and 56 is made by the usual couplings 57, in which is a common form of check-valve 58.

Each cylinder 51 is provided with a main piston 59, which is adapted to move vertically and fits snugly therein, being suitably packed at its lower end, as shown at 60 in Fig. 4, and this piston projects above the top of the cylinder 51 and terminates in a recessed head 61. The piston 59 is hollow, and extending longitudinally through the bore thereof is a smaller piston 62, which extends upward through the arm 49ª of the bracket 49, and the piston 62 is thickened at the middle, as shown at 63, and this thickened portion fits in a recess of the piston 59. The two pistons 59 and 62 are secured together by a pin 64, which passes centrally through the head 61 and through the thickened portion 63 of the piston 62. The lower end of the piston 62 is suitably packed, as shown at 60ª, and when the two pistons are secured together, as described, they will operate as one piston.

The object in having the two-part piston is that when the cylinder 33 is first being filled the pistons may be operated together so as to pump rapidly; but when the cylinder 33 is nearly full and the back-pressure is great the pin 64 may be withdrawn and the smaller piston used, so as to force the necessary amount of water into the cylinder 33.

The pump is operated by the break beam or handle 65, which is pivoted centrally to a central hub 66 of the bracket 49, and the handle passes through recesses in the thickened portions 63 of the pistons 62, as is best shown in Figs. 3 and 4, and consequently when the handle is worked up and down the pistons of the cylinders 51 will be alternately raised and lowered, so that a constant stream of water will be forced through the pipe 46 to the cylinder 33. At the point where the handle 65 passes through the piston 62 it is enlarged and made with an oval bearing-surface, as shown at 67 in Fig. 3, and the pistons are provided with oppositely-curved bearing-surfaces 68, so that the parts 67 and 68 will roll one upon the other and reduce friction.

When the pistons 62 are to be used independently of the pistons 59, it is necessary to confine the latter pistons, and consequently pins 69 are used, which pins are thrust through holes 70 in the cylinders 51 and the pistons 59.

The operation is as follows: When a stump is to be pulled, the machine is arranged so that the tripod 10 will be centrally above the stump, the blocks 14 are arranged beneath the shoes 13 of the tripod, and by means of a heavy wrench, which is applied to the spurs 20 of the cranks 17, the wheels 19 are raised and the tripod lowered, so that the shoes 13 will rest upon the blocks 14, which are arranged beneath two of the wheels and are held raised by the latches 21. The front portion of the tripod is also let down upon a block 14, and the chain 40 is wrapped around the stump and adjusted by means of the shackle 41, so as to bring it to the right length, and the grip 42 is applied in the manner described, so that it will bear against the stump. The pump 47 is then worked by means of the handle 65, and a stream of water is forced through the pipe 46 into the cylinder 33. The vent 45 of the cylinder is small, and consequently a heavy water-pressure may be produced in the cylinder, which pressure of water will lift the piston or ram 34, thus raising the cable 38 and chain 40 and lifting the stump from the ground. Trees may be also pulled in the same way.

When the machine is to be moved, the tripod is raised and the wheels lowered by means of the wrenches described, and the front wheels are raised by driving the wedge 29 beneath the block 26, and then the machine may be easily drawn to any desired place.

Having thus described my invention, I claim as new and desire to secure by Letters Patent—

1. A stump-extractor comprising a main frame carried on wheels and provided with crank-axles, means for fixing the position of the frame in relation to the wheels, a cylinder carried by the frame and having an open upper end, a movable piston mounted in the cylinder and projecting from the upper end thereof, the piston having a grooved head at the top adapted to carry a lifting-cable, and a pump carried by the frame and connected with the lifting-cylinder and with a source of water-supply, substantially as described.

2. The combination, with the machine-frame or tripod and the crank-axles and wheels connected therewith, of blocks secured to the tripod-legs and adapted to serve as abutments for the axle-cranks, and latches pivoted on the legs and adapted to hold the cranks in position, substantially as described.

3. In a stump-extractor, the combination, with a tripod, of a cylinder having sockets thereon to fit the upper ends of the tripod-legs, a movable piston mounted in the cylinder and adapted to carry a lifting-cable, and a pump connected with the cylinder and with the source of water-supply, substantially as shown and described.

ALFRED TAYLOR.

Witnesses:
R. A. DONALD,
JAMES L. KING.